US010439547B2

(12) United States Patent
Rosenberg

(10) Patent No.: US 10,439,547 B2
(45) Date of Patent: Oct. 8, 2019

(54) FRAMED MODULAR BALLAST BLOCK AND METHOD OF CONSTRUCTION

(71) Applicant: Robert Rosenberg, West Berlin, NJ (US)

(72) Inventor: Robert Rosenberg, West Berlin, NJ (US)

( * ) Notice: Subject to any disclaimer, the term of this patent is extended or adjusted under 35 U.S.C. 154(b) by 79 days.

(21) Appl. No.: 15/801,592

(22) Filed: Nov. 2, 2017

(65) Prior Publication Data

US 2018/0128417 A1 May 10, 2018

Related U.S. Application Data

(60) Provisional application No. 62/418,931, filed on Nov. 8, 2016.

(51) Int. Cl.
| | |
|---|---|
| *H02S 20/20* | (2014.01) |
| *F16M 11/20* | (2006.01) |
| *E04H 12/22* | (2006.01) |
| *F16M 11/16* | (2006.01) |
| *H02S 20/10* | (2014.01) |
| *E02D 27/00* | (2006.01) |
| *H02S 20/00* | (2014.01) |
| *E02D 27/08* | (2006.01) |
| *E04G 9/08* | (2006.01) |
| *E02D 27/42* | (2006.01) |
| *E04G 9/06* | (2006.01) |
| *E04G 13/02* | (2006.01) |

(Continued)

(52) U.S. Cl.
CPC .............. *H02S 20/20* (2014.12); *E02D 27/00* (2013.01); *E04H 12/2246* (2013.01); *E04H 12/2253* (2013.01); *F16M 11/16* (2013.01); *F16M 11/20* (2013.01); *H02S 20/10* (2014.12); *E02D 27/08* (2013.01); *E02D 27/30* (2013.01); *E02D 27/42* (2013.01); *E04G 9/06* (2013.01); *E04G 9/08* (2013.01); *E04G 9/083* (2013.01); *E04G 13/02* (2013.01); *E04G 2009/028* (2013.01); *F16M 2200/08* (2013.01); *H02S 20/00* (2013.01)

(58) Field of Classification Search
CPC ......... E02D 27/30; E02D 27/42; E02D 27/08; E04H 12/2246; E04H 12/2253; E04G 9/08; E04G 9/083; E04G 9/06; E04G 2009/028; E04G 13/02; H02S 20/20; H02S 20/10; F16M 11/20
See application file for complete search history.

(56) References Cited

U.S. PATENT DOCUMENTS 5,833,873 A * 11/1998 Adonetti ............... E04G 9/06
249/47
7,824,598 B1 * 11/2010 Kim ..................... B28B 1/44
249/125

(Continued)

*Primary Examiner* — Eret C McNichols
(74) *Attorney, Agent, or Firm* — Stuart M. Goldstein

(57) ABSTRACT

A ballast block has a uniquely designed framework consisting of lightweight, pre-fabricated, metal panel members and cross-bracing and elongated bracing members. The various components of the ballast block framework are compactly bundled and shipped to the end use location for assembly on-site. Once assembled, the ballast block framework is properly positioned on its permanent, end use location and concrete or equivalent ballast material is poured into the framework, completely filling its internal space. The ballast block can be sized and fabricated for the specific desired purpose.

8 Claims, 6 Drawing Sheets

(51) Int. Cl.
  *E02D 27/30*  (2006.01)
  *E04G 9/02*  (2006.01)

(56) References Cited

U.S. PATENT DOCUMENTS

| | | | |
|---|---|---|---|
| 9,695,558 B2 * | 7/2017 | Aston | E01D 19/04 |
| 9,882,524 B2 * | 1/2018 | Al-Haddad | H02S 20/30 |
| 10,174,513 B2 * | 1/2019 | Lo | E04G 17/002 |
| 2002/0028716 A1 * | 3/2002 | Gormley | E04H 12/2246 |
| | | | 473/423 |
| 2004/0056169 A1 * | 3/2004 | Harbaugh | E04H 12/2246 |
| | | | 248/519 |
| 2014/0059957 A1 * | 3/2014 | Stark | E02D 27/42 |
| | | | 52/292 |
| 2014/0069483 A1 * | 3/2014 | Wolter | H01L 31/18 |
| | | | 136/246 |
| 2015/0136205 A1 * | 5/2015 | Worden | F24S 25/11 |
| | | | 136/251 |
| 2015/0200619 A1 * | 7/2015 | Worden | F24S 25/13 |
| | | | 136/251 |
| 2016/0230365 A1 * | 8/2016 | Shi | E02D 27/42 |
| 2017/0159318 A1 * | 6/2017 | Cusson | E02D 27/08 |
| 2019/0055740 A1 * | 2/2019 | Clark | E04G 9/06 |

\* cited by examiner

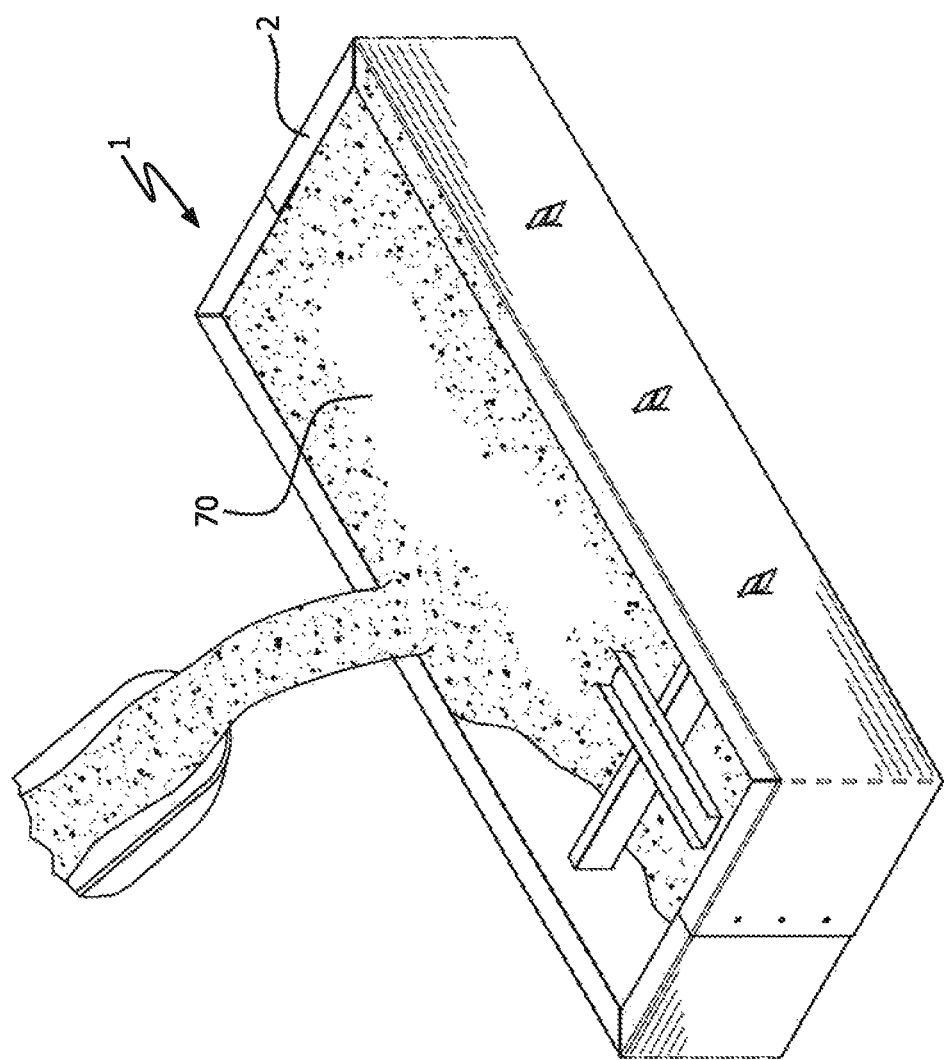

FRAMED MODULAR BALLAST BLOCK AND METHOD OF CONSTRUCTION

RELATED APPLICATION

This application claims the benefit of provisional application 62/418,931 filed on Nov. 8, 2016.

BACKGROUND OF THE INVENTION

Ballast blocks and similar anchoring and building blocks are commonly used for a variety of structures and purposes. One such important use of ballast blocks are as foundational mounts to support solar panels and their supporting systems. There is currently no ballast block member or means of fabricating a ballast block which accomplishes this need and which also is relatively easy to construct and has the versatility of selective placement at the end use location.

SUMMARY OF THE INVENTION

Specifically, the present invention relates to the design and construction of framed ballast blocks for anchoring upstanding structures, e.g. solar racking and communication towers, against meteorological and geological events. Such ballast blocks can also be used for highway barricades, protection against beach erosion, building foundations, boat and ship docks, and other applications which require high strength, stable ballast supports or protective structures.

The ballast block of the present invention comprises a uniquely designed framework consisting of lightweight, pre-fabricated, metal panel members and cross-bracing and elongated bracing members. The various components of the ballast block framework are compactly bundled and shipped to the end use location for assembly on-site. Once assembled, the ballast block framework is properly positioned on its permanent, end use location and concrete or equivalent ballast material is poured into the framework, completely filling its internal space. The ballast block can be sized and fabricated for the specific desired purpose.

The ballast block of the present invention provides a low cost, lightweight framing structure which is conveniently and easily shipped, located, and assembled right at the end use site. Once set in place and filled with concrete or other heavy ballast material, it provides a stable and effective foundation.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

BRIEF DESCRIPTION OF THE DRAWINGS

FIG. 4 illustrates the filling of the ballast block framework of the present invention with ballast material.

DETAILED DESCRIPTION OF THE INVENTION

Figure 1:
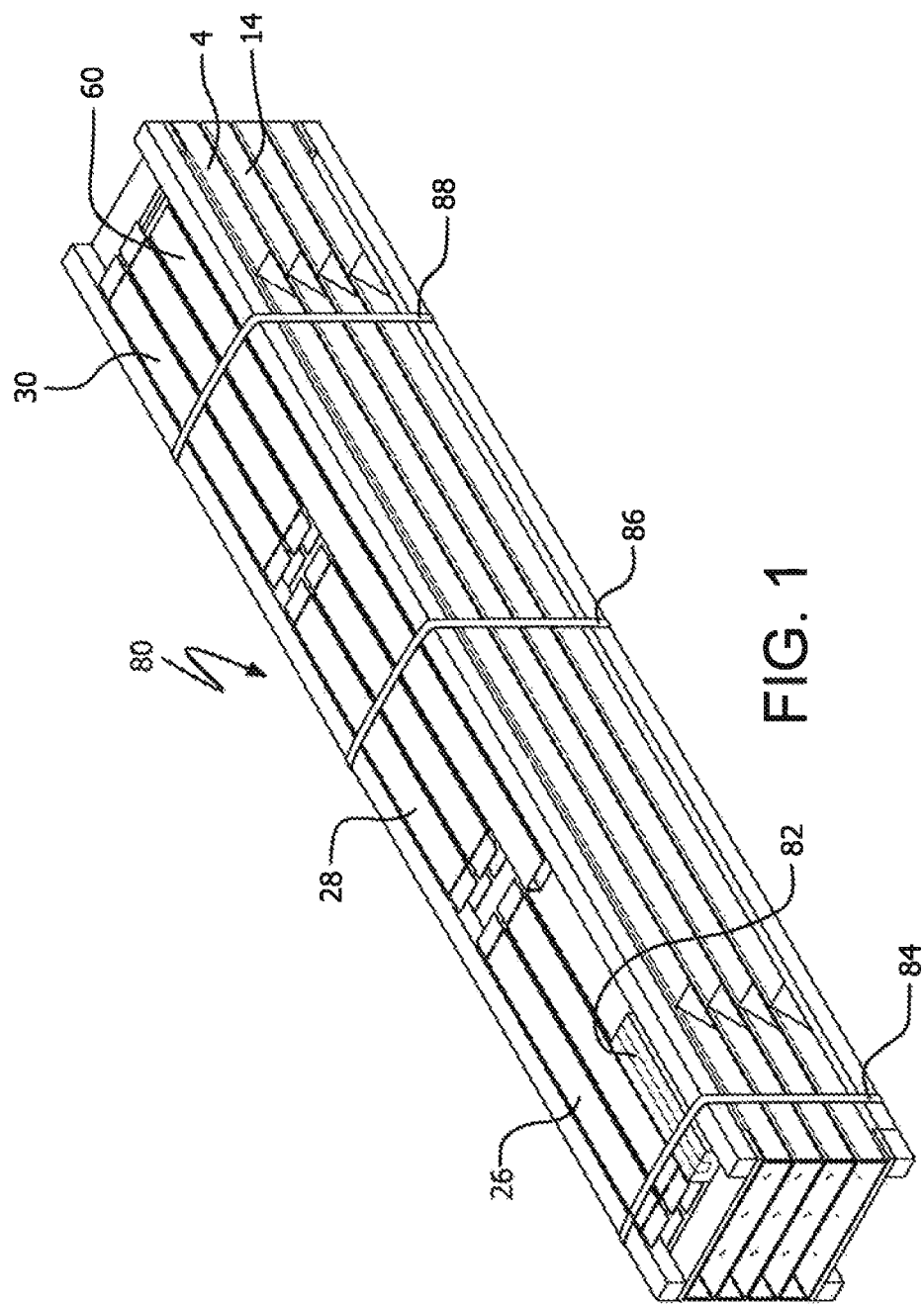
FIG. 1 is an isometric view of the stacked and secured bundle of ballast block framework components of the present invention.

Ballast block 1 of the present invention comprises framework 2 having first panel member 4 and second panel member 14. First panel ember 4 comprises sidewall section 6 extending the length of framework 2 of ballast block 1, first end wall section 8, and second end wall section 10. End wall sections 8 and 10 are connected by perforated hinges 12 and 13 to sidewall section 6 and are folded inward at the hinges so that they are positioned at a 90° angle to the sidewall section. In like manner, second panel member 14 comprises sidewall section 16 extending the length of framework 2 of ballast block 1, first end wall section 18, and second end wall section 20. End wall sections 18 and 20 are connected by perforated hinges 22 and 23 to sidewall section 16 and are folded inward at the hinges so that they are positioned at a 90° angle to the sidewall section. To form framework 2, folded end wall section 8 is aligned with and is positioned to overlap end wall section 18 and folded end wall section 10 is aligned with and is positioned to overlap end wall section 20. The end wall sections are secured by screws or equivalent fasteners 9.

First panel member 4 and second panel member 14 are formed of relatively lightweight, heavy duty 12/14 gauge galvanize steel.

Figure 2:
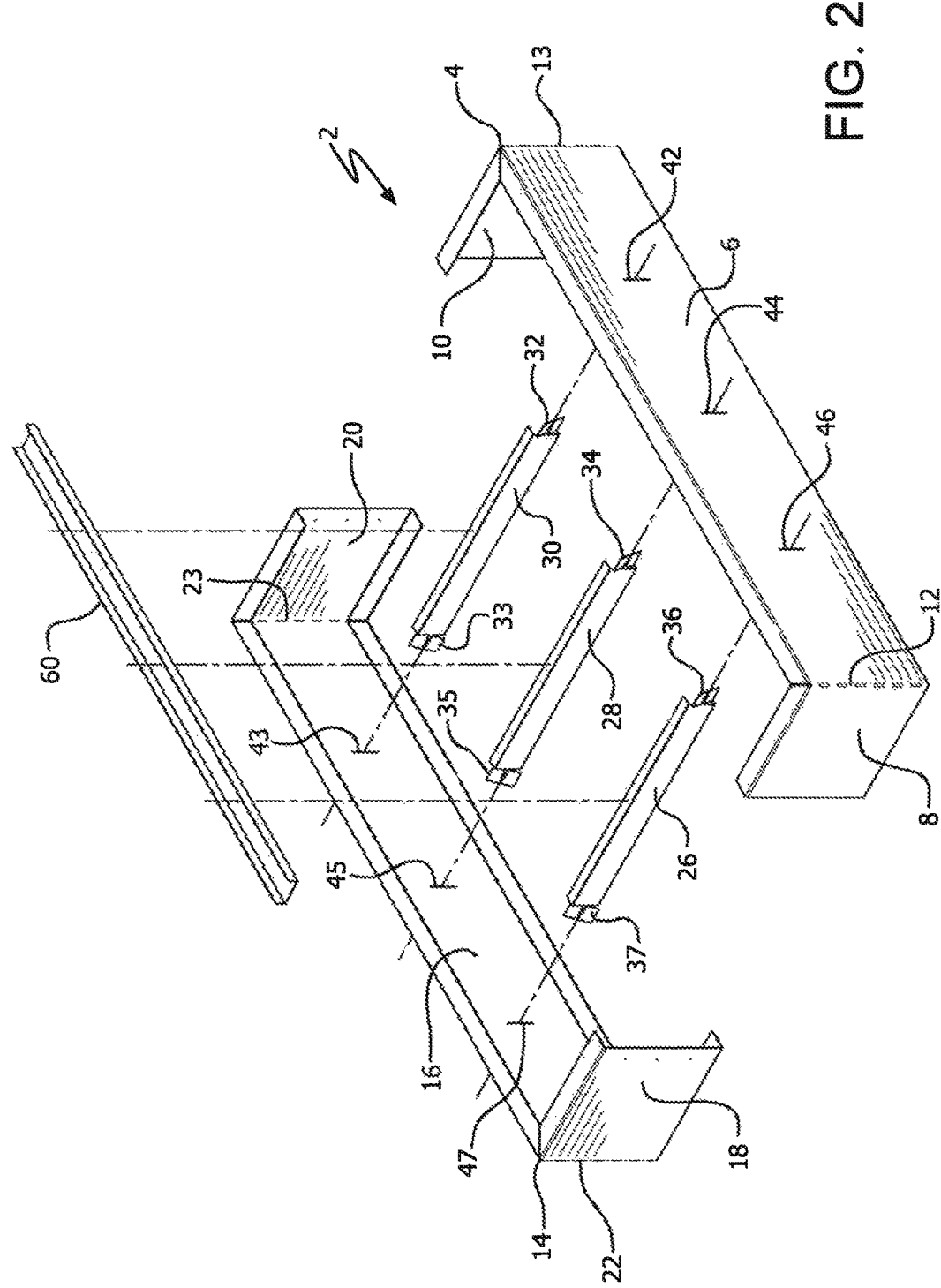
FIG. 2 is an exploded view of the ballast block framework components of the present invention.
Figure 3:
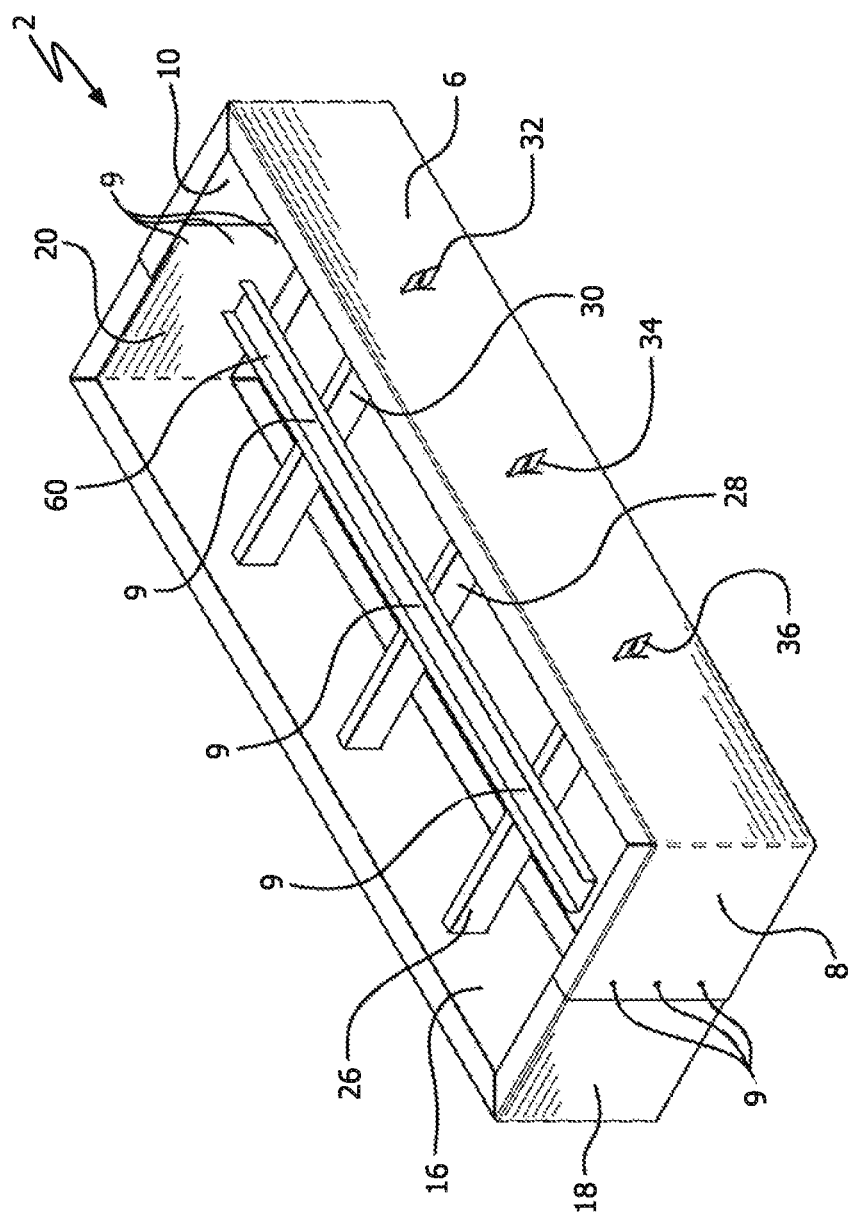
FIG. 3 is a view of the assembled ballast block framework of the present invention.

Cross-bracing members 26, 28, and 30 have tab member connectors 32, 33, 34, 35, 36 and 37 extending from the termini of the connectors, as best seen in FIG. 2. The tab member connectors are configured to be inserted into slots 42, 43, 44, 45, 46, and 47 in sidewall sections 6 and 16 in order to secure cross-bracing members 26, 28, and 30 between the sidewall sections, as best seen in FIG. 3.

Figure 8:
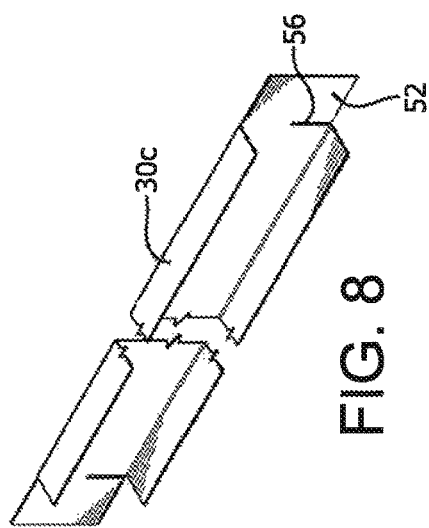
FIGS. 5-8 illustrate various embodiments of the tab member connector of the present invention.
Figure 7:
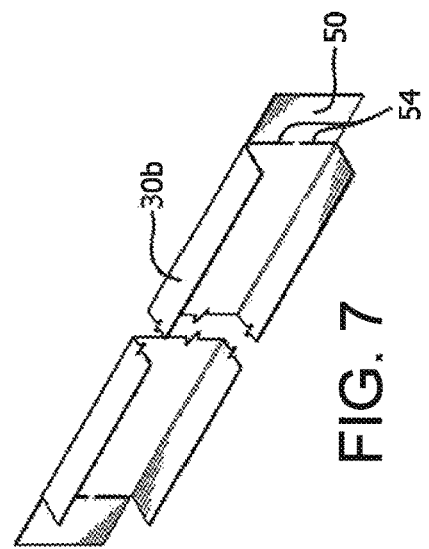
Figure 5:
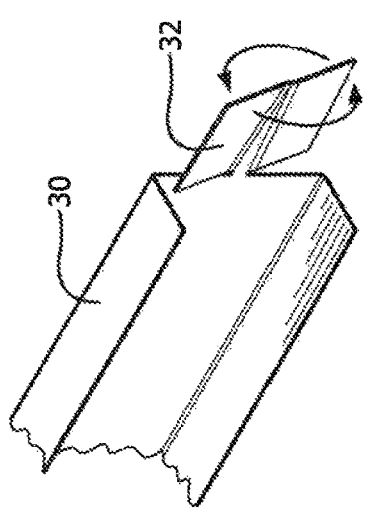
Figure 6:
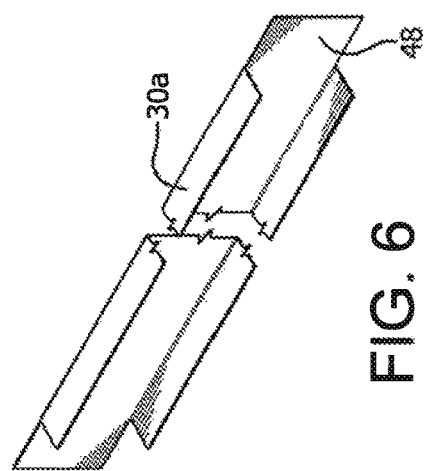

It is contemplated that various types of tab member connectors can be used. For example, connectors 32, 33, 34, 35, 36, and 37, shown in FIGS. 2-5, are twist connectors. FIG. 6 shows tab member connector 48 extending from cross-bracing member 30a, as a flat plate which is configured to be folded against sidewall sections 6 and 16 and secured in place by a fastener. FIGS. 7 and 8 show tab member connectors 50 and 52 extending from cross-bracing members 30b and 30c, having slits 54 and 56 which are designed to be inserted straight into the metal of sidewall sections 6 and 16.

Elongated bracing member 60 is positioned over cross-bracing members 26, 28, and 30 and secured thereto by screws or equivalent fasteners 9. Bracing member 60 is provided, not only to provide added strength to framework 2, but also as a support member to facilitate construction of structures which are built on ballast block 1.

Framework 2 is filled with ballast material 70, such as concrete or landfill, to form completed ballast block 1. See FIG. 4.

A significant advantage of this invention resides in the manner in which it is designed to be transported and then constructed at its end use location. All the components of ballast block framework 2 are designed to be stacked, in a disassembled state, in a compact, easy to transport, secured bundle 80. FIG. 1 shows an example of how two ballast block frameworks can be packaged in bundle 80, with ballast block framework components such as panel members 4 and 14, cross-bracing members 26, 28, and 30, elongated bracing member 60, and fastener hardware container 82.

Binding straps 84, 86, and 88 tightly secure the framework components within bundle 80.

Bundle 80 is transported to the end use location of ballast block 1, where the ballast block framework components are unfastened and separated from the bundle. The various framework components are then assembled into the framework configuration previously described and shown in FIGS. 2 and 3, to form completely formed ballast block framework 2.

Framework 2 is next transported to and positioned on its exact end use location, where it is filled with ballast material 70 to form ballast block 1, ready to be used.

Figure 9:
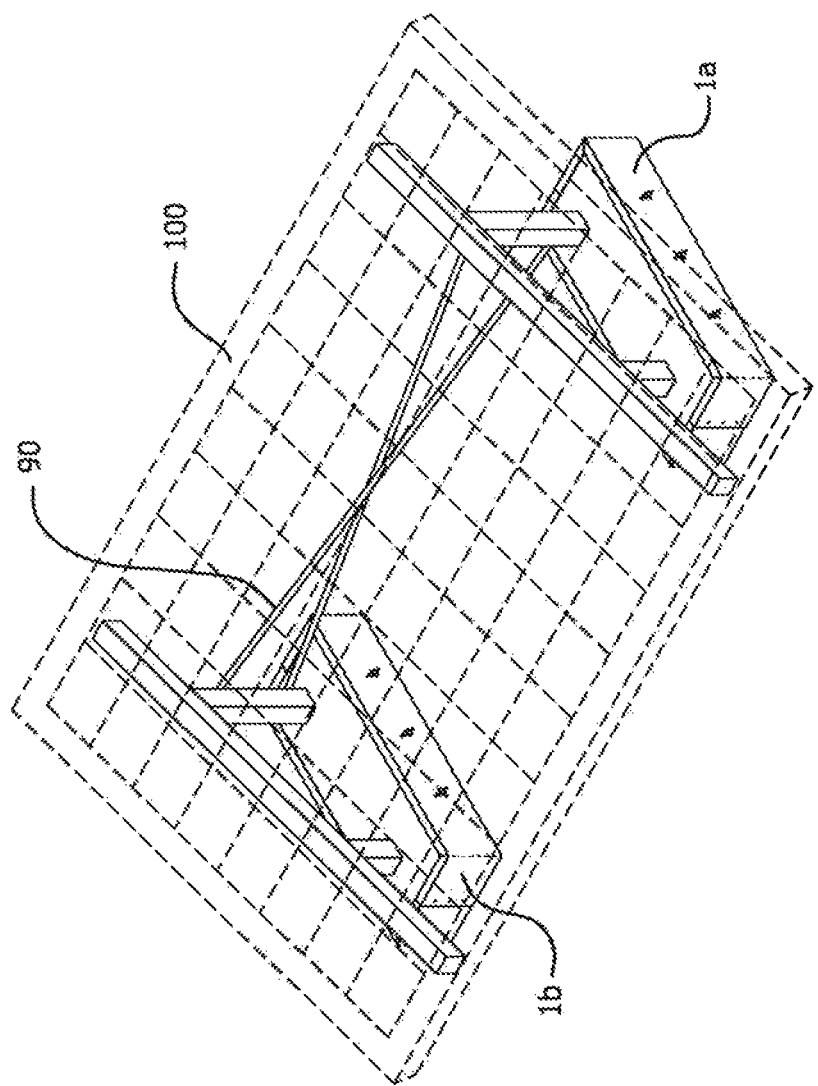
FIG. 9 illustrates the use of the ballast block of the present invention supporting a solar panel system.

FIG. 9 illustrates an example of how the ballast blocks of the invention are to be utilized. Ballast blocks 1*a* and 1*b* are positioned to support solar panel racking system 90 designed to rigidly and permanently support solar panels 100.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. A ballast block comprising:
   a framework comprising:
      a first panel member having a sidewall section extending the length of the ballast block and first and second end wall sections each end wall section positioned at an angle to the panel member;
      a second panel member having a sidewall section extending the length of the ballast block and first and second end wall sections each end wall section positioned at an angle to the sidewall section;
      cross-bracing members extending between the first and second panel members; and
      connectors comprising tab members having slits, the connectors extending from the termini of each of the cross-bracing, members; and
      an elongated bracing member positioned over and connected to the cross-bracing members; and
   ballast material filling the framework between the first and second panel members.

2. The ballast block as in claim 1 wherein the end wall sections of the first and second panel members are attached to their respective panel members by foldable hinges.

3. The ballast block as in claim 1 wherein the sidewall sections of the first and second panel members have slots therethrough into which the connectors are inserted, whereby upon insertion of the connectors into the slots, the cross-bracing members are secured to the panel members.

4. The ballast block as in claim 1 in which the tab members are twist connectors.

5. The ballast block as in claim 1 wherein the tab connectors are folded against the first and second side panels and are secured by fasteners.

6. The ballast block as in claim 1 wherein the ballast material is concrete.

7. The ballast block as in claim 1 wherein the ballast material is landfill.

8. The ballast block as in claim 1 wherein the end wall sections of the first and second panel members are positioned at an 90° angle to the side wall sections of the panel members.

\* \* \* \* \*